United States Patent [19]
Clegg

[11] 4,277,148
[45] Jul. 7, 1981

[54] CONICAL SPLIT-IMAGE MICROSCOPIC LENS

[76] Inventor: John E. Clegg, 2320 Keystone Dr., Orlando, Fla. 32806

[21] Appl. No.: 209,865

[22] Filed: Nov. 24, 1980

[51] Int. Cl.³ .................................................. G02B 5/04
[52] U.S. Cl. ...................................... 350/432; 350/286
[58] Field of Search .................. 350/286, 287, 432, 414

[56] References Cited
U.S. PATENT DOCUMENTS

| | | | |
|---|---|---|---|
| 2,821,111 | 1/1958 | Coleman | 350/286 |
| 2,882,784 | 4/1959 | Toffolo | 350/286 |
| 3,547,526 | 12/1970 | Devereux | 350/286 |
| 4,128,308 | 12/1978 | McNaney | 350/286 |
| 4,214,813 | 7/1980 | McNaney | 350/286 |

*Primary Examiner*—Conrad J. Clark

[57] ABSTRACT

The disclosure is a microscopic lens comprising three component lenses with concave and convex conical sections which refract light rays. Rays emanating from an object pass through five conical surfaces, first being refracted outward and separated to form a ring image, and then being refracted inward and rejoined to form an enlarged image. There is one outward refraction as opposed to three inward refractions, and it is the difference between these refractions that produces magnification of the object.

Magnification produced by one conical microscopic lens is small, so a number of lenses are used to form multi-stage microscopes in which magnification increases at an exponential rate. Thus, though the initial stage lens might produce a small magnification of only 4.5×, two stages will produce a magnification of 20×, three stages 91×, four stages 410×, etc. Eight stages produce a magnification in excess of 100,000×, which is in the range of magnification achieved by electron scanning microscopes.

The use of multiple stages is possible because both the rays entering the lenses and the rays leaving the lenses are parallel.

1 Claim, 5 Drawing Figures

CONICAL SPLIT-IMAGE MICROSCOPIC LENS

BACKGROUND OF THE INVENTION

The invention relates to light-transmission instruments, specifically to microscopes.

Prior art is limited to spherical microscopic lenses. The inventor is aware of no conical lenses which separate rays so as to produce an annular image and then combine the rays to form an enlarged image.

BRIEF SUMMARY OF THE INVENTION

The invention is a multi-stage, parallel-ray split-image, conical microscopic lens. The microscopic or stage lens consists of three component lenses with five conical refracting sections and one planar section. The component lenses are aligned on a common axis and are designated lower component lens, middle component lens, and upper component lens.

The lower component lens has a concave conical section in its base which receives parallel rays emanating from an object and refracts these rays outward from the common axis to a convex conical section lying just inside the perimeter of the lens. This latter section refracts the rays in a direction parallel to the common axis, forming an annular image of the object. (This image is not visible since it lies inside the microscopic tube.)

A convex conical section and a concave conical section of the middle component lens refract the rays inward toward the common axis, and a concave conical section of the upper component lens recombines the rays in a direction parallel to the common axis and produces an enlarged image of the object. The rays forming the enlarged image exit the upper component lens through a planar section.

The size of the enlarged image produced by a stage lens is limited by the diameter of the lens, since the image is formed from parallel rays and not from diverging rays which form the virtual image of a spherical lens. It is necessary, therefore, to use two or more stages when higher magnification is required. Each additional stage receives parallel rays from the central portion of the enlarged image produced by the stage below it and magnifies this portion an equal number of times, thereby increasing the magnification at an exponential rate. The increase in magnification is as follows: one stage magnifies the object 4.5×, two stages 20×, three stages 91×, four stages 410×, etc. Nine stages produce a magnification of 756,681× (4.5⁹), but this magnification can be considered to be theoretical, depending on the accuracy with which the conical sections of the lens can be ground, this being a matter which will be discussed later.

DETAILED DESCRIPTION OF THE PREFERRED EMBODIMENT

There are no moving mechanical parts in the split-image conical microscope, since the absence of focusing eliminates the need of longitudinal movement of the lenses. Also, the lenses are relatively wide. These two features render the instrument well-suited for use as a standing microscope, which is the type used in the Description and Drawings of the application. It should be understood, however, that high-magnification instruments using more than four stages should be mounted on more substantial bases or on tilting stands.

Figure 1:
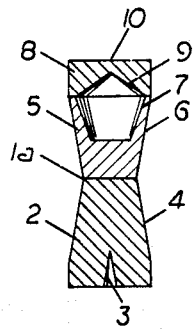
FIG. 1 is a longitudinal section of a stage lens.

FIG. 1 is a longitudinal section of a stage lens 1a consisting of three component lenses; lower component lens 2 with concave conical section 3 and convex conical section 4, middle component lens 5 with convex conical section 6 and concave conical section 7, and upper component lens 8 with concave conical section 9 and planar section 10. All surfaces of the lenses not used for the transmission of light rays are opaque.

Figure 2:
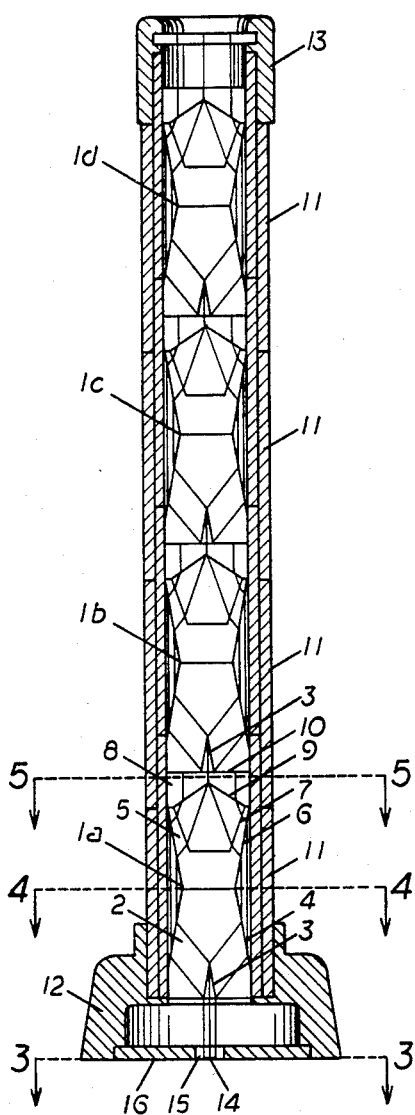
FIG. 2 is an elevation of a standing conical split-image microscope.
Figure 3:
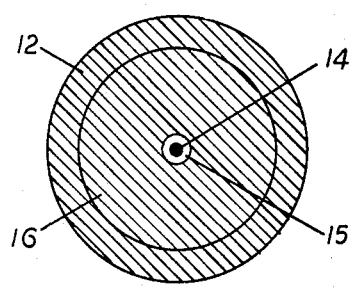
FIG. 3 is a cross section taken on line 3—3 of FIG. 2.

FIG. 2 is an elevation of a standing microscope showing four stage lens 1a, 1b, 1c and 1d mounted inside separate tubes 11 which are joined to form one continuous tube, which is mounted on a transparent lucite base 12 and equipped at the top with an eyepiece 13. The object 14 to be magnified lies at the center of hole 15 in lucite base plate 16. Object 14 appears as a small black disk in FIG. 3.

The common axis on which the lenses are aligned is not shown, since it would be confused with light rays. It can be visualized, however, as passing through the center of object 14 and its enlarged images and through the apex of each conical section.

Figure 5:
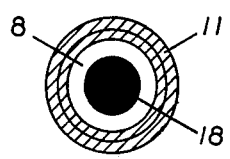
FIG. 5 is a cross section taken on line 5—5 of FIG. 2.
Figure 4:
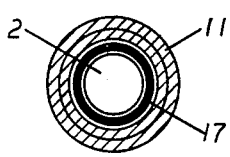
FIG. 4 is a cross section taken on line 4—4 of FIG. 2.

The transmission and refraction of light rays is illustrated in FIG. 2, as follows;

Parallel rays emanating from object 14 are refracted outward from the common axis by concave conical section 3, then refracted in a direction parallel to the common axis by convex conical section 4, forming ring image 17 as shown in FIG. 4. Convex conical section 6, concave conical section 7 and concave conical section 9 refract the rays back toward the common axis where the rays converge to form enlarged whole image 18, as shown in FIG. 5.

The angles of incidence and refraction of the rays are as follows:

|  | Bi | Br |
|---|---|---|
| Lower Component Lens 2: | | |
| Concave Conical Section 3 | 80° | 41° |
| Convex Conical Section 4 | 41° | 80° |
| Middle Component Lens 5: | | |
| Convex Conical Section 6 | 80° | 41° |
| Concave Conical Section 7 | 31° | 50.6° |
| Upper Component Lens 8: | | |
| Concave Conical Section 9 | 50.6° | 31° |
| Planar Section 10 | 0° | 0° |

Parallel rays of the enlarged whole image 18 emanating from the center of planar section 10 of stage lens 1a are received by concave conical section 3 of stage lens 1b, and the pattern of refraction and transmission of rays which occurred in stage lens 1a is repeated.

The increase in magnification achieved by stage lens 1a, 1b, 1c and 1d, plus five additional stage lens, is exponential, as shown below:

| Number of Stages | Magnification | |
|---|---|---|
| 1 (1a) | 4.5 = | 4.5X |
| 2 (1b) | 4.5² = | 20X |
| 3 (1c) | 4.5³ = | 91X |
| 4 (1d) | 4.5⁴ = | 410X |

-continued

| Number of Stages | Magnification |
|---|---|
| 5 | $4.5^5 =$ 1845X |
| 6 | $4.5^6 =$ 8304X |
| 7 | $4.5^7 =$ 37,367X |
| 8 | $4.5^8 =$ 168,151X |
| 9 | $4.5^9 =$ 756,681X |

The accuracy with which the conical sections of the component lenses can be ground imposes limitations on the magnification which can be achieved. This is especially true concerning the apex of the concave conical sections 3 and 9 of the lens, and it might be well to consider the higher magnification produced by seven, eight and nine stages theoretical until it can be determined what degree of accuracy can be achieved in grinding the apex areas of the lenses.

It should be noted, however, that a perfect alignment of stages on a common axis is not a prerequisite. Stages can be positioned off-center in their tubes so as to avoid magnifying the central apex area of the enlarged images, or at least place this area off to one side of the next enlarged image. Thus the increase in magnification by each successive stage would be free from the distortion which is most likely to occur in the critical apex area of the images.

I claim:

1. A microscopic lens comprising three component lenses, with each component lens having one or two conical sections with surfaces which refract light rays at prescribed angles, with all conical sections of the component lenses being aligned on a common axis which is parallel to the light rays entering and emanating from the component lenses, with all surfaces of the component lenses not used for the refraction and transmission of light rays being opaque, (a) with a lower component lens being positioned above an object and having a concave conical section which receives parallel rays emanating from the object and refracts these rays outward from the common axis at a prescribed angle, and having a convex conical section which receives rays emanating from the concave conical section of the lower component lens and refracts these rays parallel to the common axis, thereby forming an annular image of the object, (b) with a middle component lens being above and adjacent to the lower component lens and having a convex conical section which receives rays emanating from the convex conical section of the lower component lens and refracts these rays inward toward the common axis, and having a concave conical section which receives rays emanating from the convex conical section of the middle component lens and refracts these rays inward toward the common axis, (c) and with an upper component lens being above and adjacent to the middle component lens and having a concave conical section which receives rays emanating from the concave conical section of the middle component lens and refracts these rays parallel to the common axis, forming an enlarged whole image of the object, and having a planar section which receives rays emanating from the concave conical section of the upper component lens and transmits these rays out of the upper component lens in a direction parallel to the common axis.

* * * * *

UNITED STATES PATENT AND TRADEMARK OFFICE
CERTIFICATE OF CORRECTION

PATENT NO. : 4,277,148
DATED : July 7, 1981
INVENTOR(S) : John E. Clegg

It is certified that error appears in the above—identified patent and that said Letters Patent is hereby corrected as shown below:

Column 2, the table beginning on line 44, in the heading,

"Bi     Br" should read -- θi     θr --.

Signed and Sealed this

*Twenty-second* Day of *September 1981*

[SEAL]

*Attest:*

GERALD J. MOSSINGHOFF

*Attesting Officer*    *Commissioner of Patents and Trademarks*